(12) United States Patent
Plowman

(10) Patent No.: US 10,832,428 B2
(45) Date of Patent: Nov. 10, 2020

(54) METHOD AND APPARATUS FOR ESTIMATING A RANGE OF A MOVING OBJECT

(71) Applicant: Continental Automotive GmbH, Hannover (DE)

(72) Inventor: Robin Plowman, Southwick (GB)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/486,261

(22) PCT Filed: Dec. 18, 2017

(86) PCT No.: PCT/EP2017/083233
§ 371 (c)(1),
(2) Date: Aug. 15, 2019

(87) PCT Pub. No.: WO2018/149539
PCT Pub. Date: Aug. 23, 2018

(65) Prior Publication Data
US 2019/0362512 A1    Nov. 28, 2019

(30) Foreign Application Priority Data
Feb. 20, 2017  (EP) .................................... 17157004

(51) Int. Cl.
*G06T 7/55*  (2017.01)
*G06T 7/80*  (2017.01)
(Continued)

(52) U.S. Cl.
CPC ............... *G06T 7/55* (2017.01); *G06T 7/215* (2017.01); *G06T 7/248* (2017.01); *G06T 7/74* (2017.01);
(Continued)

(58) Field of Classification Search
None
See application file for complete search history.

(56) References Cited

U.S. PATENT DOCUMENTS

| 6,812,831 B2 * | 11/2004 | Ikeda ..................... B60K 35/00 |
| | | 340/435 |
| 2008/0243389 A1 * | 10/2008 | Inoue ..................... G08G 1/165 |
| | | 701/301 |

(Continued)

FOREIGN PATENT DOCUMENTS

| GB | 2 445 866 A | * | 7/2008 | ............... G06T 7/00 |
| JP | 2016-176736 A | * | 10/2016 | ............... G01C 3/06 |
| WO | WO 2013/081984 | | 6/2013 | |

OTHER PUBLICATIONS

International Search Report of the International Searching Authority for International Application PCT/EP2017/083233, dated Feb. 6, 2018, 2 pages, European Patent Office, HV Rijswijk, Netherlands.

(Continued)

*Primary Examiner* — Hung Q Dang
(74) *Attorney, Agent, or Firm* — W. F. Fasse

(57) ABSTRACT

A method for estimating a range of a moving object (MO) includes steps of capturing (S1) images of a surrounding by a camera (2), processing (S2) features of captured images to determine a bearing of a moving object (MO) based on a detected cluster of features belonging to the moving object (MO) within the captured images, and estimating (S3) a range of the moving object (MO) based on determined ground features belonging to a ground plane (GP) along the determined bearing of the moving object (MO) which are not occluded by the moving object (MO).

16 Claims, 2 Drawing Sheets

(51) Int. Cl.
- *G06T 7/215* (2017.01)
- *G06T 7/73* (2017.01)
- *G06T 7/00* (2017.01)
- *G06T 7/246* (2017.01)
- *G06K 9/00* (2006.01)

(52) U.S. Cl.
CPC ............... *G06T 7/80* (2017.01); *G06T 7/97* (2017.01); *G06T 2207/10028* (2013.01); *G06T 2207/30261* (2013.01)

(56) References Cited

U.S. PATENT DOCUMENTS

| | | | | |
|---|---|---|---|---|
| 2014/0037138 A1* | 2/2014 | Sato | ....................... | G08G 1/166 382/103 |
| 2014/0313339 A1* | 10/2014 | Diessner | ................. | H04N 7/18 348/148 |
| 2015/0175072 A1* | 6/2015 | Sabeti | .................... | B60Q 9/008 348/148 |
| 2016/0335510 A1* | 11/2016 | Gupta | ................ | G06K 9/00805 |
| 2017/0140231 A1* | 5/2017 | Chen | .................. | G06K 9/00785 |

OTHER PUBLICATIONS

PCT Written Opinion of the International Searching Authority for International Application PCT/EP2017/083233, dated Feb. 6, 2018, 12 pages, European Patent Office, HV Rijswijk, Netherlands.

Extended European Search Report and Examination Report for European Patent Application No. 17157004.7, dated Jul. 12, 2017, 11 pages, European Patent Office, Munich, Germany.

Gary Bradski et al., "Chapter 12: Projection and 3D Vision", In: "Learning OpenCV—Computer Vision with the OpenCV Library", Jan. 1, 2008, O'Reilly, Beijing, XP055387725, ISBN: 978-0-596-51613-0, pp. 405 to 458.

* cited by examiner

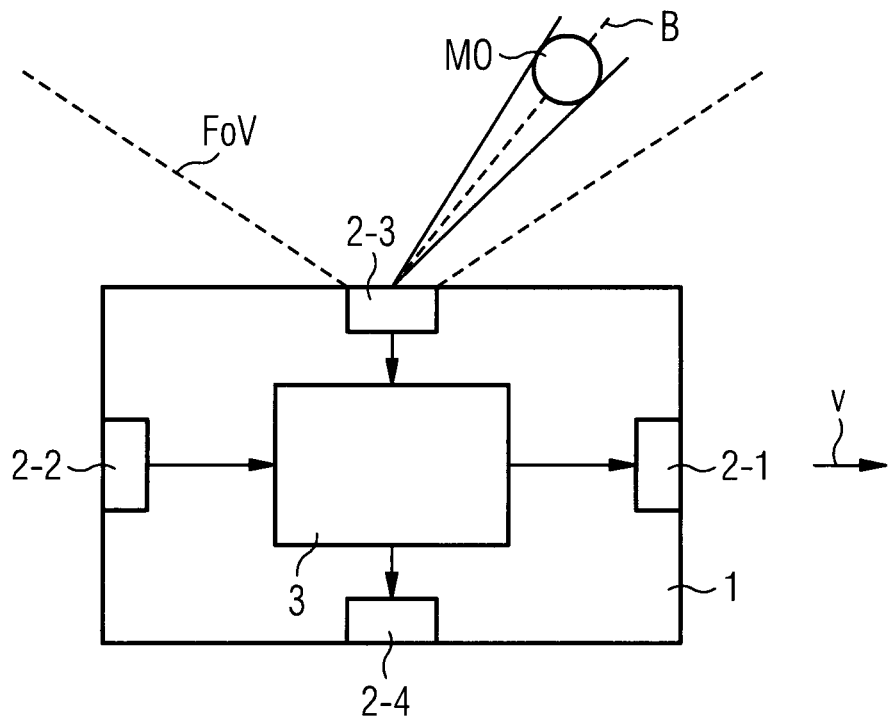
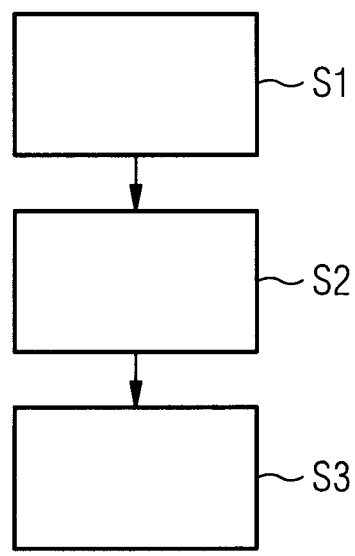

METHOD AND APPARATUS FOR ESTIMATING A RANGE OF A MOVING OBJECT

FIELD OF THE INVENTION

The invention relates to a method and apparatus for estimating a range of a moving object, in particular for estimating a range of a moving object such as a pedestrian in the vicinity of a vehicle.

BACKGROUND INFORMATION

Vehicles are increasingly equipped with driver assistance systems which assist the driver of the vehicle in performing driving maneuvers. To support the driver vehicles can comprise vehicle cameras which are mounted to the vehicle's chassis on different sides. These cameras capture images of the vehicle's surrounding. From the captured images, a surround view of the vehicle's surrounding can be calculated and displayed to the driver of the vehicle. A vehicle can comprise a front view camera, a rear view camera and two side view cameras to capture images of the surrounding. The driver assistance system of the vehicle can use the processed camera images to provide assistance functions to the driver during driving maneuvers. For instance, the driver assistance system can support the driver in performing a parking maneuver. A conventional driver assistance system can also provide security functions on the basis of the processed camera images. More and more driving maneuvers are performed semi-automatically or even fully automatically using driver assistance functions.

For many use cases, it is important to detect a range of a moving object in the vicinity of a vehicle. This moving object can comprise for instance a pedestrian or another moving object such as a car or a vehicle moving in the vehicle's surrounding. For instance, during a parking maneuver, it is essential that the vehicle's chassis does not collide with a pedestrian moving in the vehicle's surrounding.

SUMMARY OF THE INVENTION

Accordingly, it is an object of the present invention to provide a method and apparatus for estimating a range of a moving object.

According to a first aspect, the invention provides a method for estimating a range of a moving object comprising the steps:

capturing images of a surrounding by at least one camera,
processing features of captured images to determine a bearing of a moving object on the basis of, a detected cluster of features belonging to the moving object within the captured images, and
estimating a range of the moving object on the basis of ground features belonging to a ground plane along the determined bearing of the moving object which are not occluded by the moving object.

In a possible embodiment of the method according to the first aspect of the present invention, from the determined ground features not occluded by the moving object the ground feature having a maximum distance is selected and the range of the moving object is estimated according to the maximum distance.

In a possible embodiment of the method according to the first aspect of the present invention, images of a vehicle's surrounding are captured by a vehicle camera of a vehicle while the vehicle is moving.

In a still further possible embodiment of the method according to the first aspect of the present invention, features in the captured images are detected and matched in each captured image to generate feature tracks between positions of corresponding features in the captured images.

In a further possible embodiment of the method according to the first aspect of the present invention, position coordinates of the features are converted into normalized homogeneous image coordinates using camera calibration.

In a further possible embodiment of the method according to the first aspect of the present invention, a translation and rotation of the camera during a time period between captured images is determined on the basis of the vehicle's speed, V, the vehicle's steering angle, $\alpha$, and on the basis of a wheelbase, W.

In a further possible embodiment of the method according to the first aspect of the present invention, a three-dimensional point cloud of features indicating a position of each feature in a three-dimensional space is calculated on the basis of the normalized homogeneous image coordinates and the calculated translation and rotation of the camera.

In a further possible embodiment of the method according to the first aspect of the present invention, an essential matrix is calculated for a motion of the camera on the basis of the determined rotation and translation of the camera.

In a further possible embodiment of the method according to the first aspect of the present invention, the epipolar constraint is applied to the tracked features using the essential matrix.

In a further possible embodiment of the method according to the first aspect of the present invention, the tracked features are segmented into features belonging to moving objects and into features belonging to static objects on the basis of an error function, which measures how well the features fulfill the epipolar constraint, wherein the error function comprises the algebraic distance, geometric distance, reprojection error or sampson error.

In a further possible embodiment of the method according to the first aspect of the present invention, the tracked features are segmented into features belonging to moving objects and into features belonging to static objects on the basis of other suitable methods, such as measuring the variance of a error function over time.

In a further possible embodiment of the method according to the first aspect of the present invention, the segmented features belonging to moving objects are clustered and a convex hull around the segmented features of each cluster is calculated.

In a further possible embodiment of the method according to the first aspect of the present invention, an azimuth bearing of a moving object is determined on the basis of the calculated convex hull around a cluster of segmented features belonging to the moving object.

In a further possible embodiment of the method according to the first aspect of the present invention, ground features are determined by selecting triangulated features belonging to static objects with a height below a threshold height.

According to a second aspect, the invention provides an apparatus adapted to estimate a range of a moving object wherein said apparatus comprises a processing unit adapted to process features of captured images to determine a bearing of a moving object on the basis of a detected cluster of features belonging to the moving object within the captured images, and adapted to estimate a range of the moving object on the basis of ground features belonging to a ground plane along the determined bearing of the moving object which are not occluded by the moving object.

According to a third aspect, the invention provides a vehicle comprising at least one vehicle camera adapted to capture images of the vehicle's surrounding and comprising an apparatus according to the second aspect of the present invention adapted to estimate a range of a moving object in the vehicle's surrounding.

In a possible embodiment of the vehicle according to the third aspect of the present invention, the moving object comprises a pedestrian or another vehicle in the vehicle's surrounding.

BRIEF DESCRIPTION OF THE DRAWINGS

In the following, possible embodiments of the different aspects of the present invention are described in more detail with reference to the enclosed figures.

FIG. 1 shows a schematic block diagram for illustrating a possible exemplary embodiment of a vehicle comprising an apparatus for estimation of a range of a moving object according to an aspect of the present invention;

FIG. 2 shows a flowchart of a possible exemplary embodiment of a method for estimating a range of a moving object according to an aspect of the present invention;

DETAILED DESCRIPTION OF EXAMPLE EMBODIMENTS OF THE INVENTION

Figure 3:
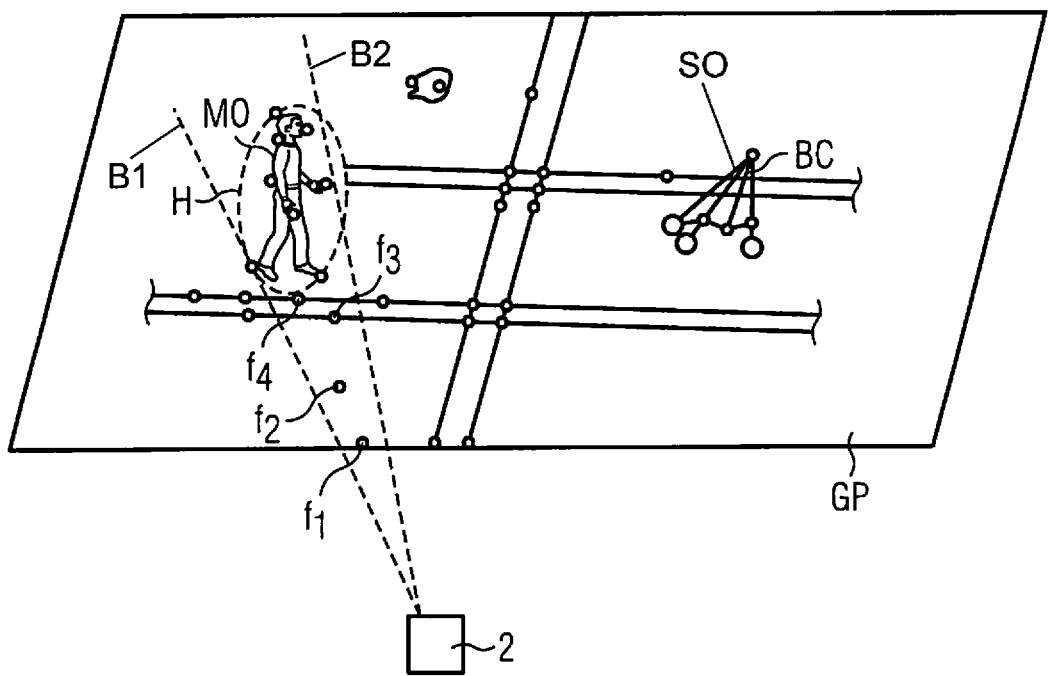
FIG. 3 shows a schematic diagram for illustrating the operation of a method and apparatus according to the present invention.

As can be seen in the schematic block diagram of FIG. 1, a vehicle 1 comprises in the illustrated embodiment an apparatus 3 adapted to estimate a range of a moving object MO in the vehicle's surrounding. The apparatus 3 can form part of a driver assistance system of the vehicle 1. The vehicle 1 comprises in the illustrated exemplary embodiment different vehicle cameras 2-1, 2-2, 2-3, 2-4. The vehicle 1 can drive with a velocity or speed V in a specific direction as illustrated in FIG. 1. In the example illustrated in FIG. 1, a moving object MO is within the field of view FoV of vehicle camera 2-3 mounted on the left side of the vehicle's chassis.

The moving object MO shown schematically in FIG. 1 can be for instance a pedestrian or another vehicle moving in the vicinity of the vehicle 1. The apparatus 3 receives from the different vehicle cameras 2-$i$ digital camera images. The apparatus 3 comprises a processing unit adapted to process features of captured images to determine a bearing B of the moving object MO on the basis of a detected cluster of features belonging to the moving object MO within the captured images of the respective vehicle camera, i.e. a single vehicle camera 2-3 in the illustrated example of FIG. 1. The processing unit is further adapted to estimate a range of the moving object MO on the basis of ground features belonging to a ground plane in an area or bearing range along the determined bearing B of the moving object MO which are not occluded by the moving object MO. The range of the moving object MO is the distance of the moving object MO to the vehicle's chassis in the illustrated example of FIG. 1. The number of vehicle cameras 2-$i$ can differ in different vehicles. The vehicle 1 shown in FIG. 1 can be for instance a car or a truck moving on a road or moving on a parking space.

FIG. 2 shows a flowchart of a possible exemplary embodiment of a method for estimating a range of a moving object MO according to an aspect of the present invention. In the illustrated embodiment, the method comprises three main steps S1, S2, S3.

In a first step S1, images of a surrounding are captured by a camera.

In a further step S2, the features of captured images are processed to determine a bearing B of a moving object MO on the basis of a detected cluster of features belonging to the moving object MO within the captured images of the camera.

Finally, in step S3, a range of the moving object MO is estimated on the basis of determined ground features belonging to a ground plane in a bearing range around the determined bearing B of the moving object MO which are not occluded by the moving object MO.

In a possible embodiment, images are captured by vehicle cameras of a vehicle 1. The images of the vehicle's surrounding are captured by at least one vehicle camera 2 of a vehicle 1 while the vehicle 1 is moving. The camera images are taken at different times. The camera images include a ground plane around the vehicle and may include at least one moving object MO such as a pedestrian or another vehicle. In a possible embodiment, the camera images are captured at a predetermined frame rate which can comprise for instance 1 to 50 frames per second. The frame rate can depend on the used hardware platform, the CPU load, in particular how many other algorithms are running on the same processing unit. The camera 2 captures a sequence of camera images wherein the gap between two camera images can vary between $\frac{1}{50}$th of a second and one second for the above-mentioned frame rates. At a velocity or speed of up to around 60 km/h, this means that many of the features captured in a first camera image are still visible in the second (next) camera image. This is important because two views or camera images of the ground features or ground plane around the vehicle 1 are necessary so that the three-dimensional feature positions can be calculated when using Structure From Motion, SFM, to triangulate static features. With increasing speed, V, of the vehicle 1, the frame rates of the frames captured by the vehicle camera can be increased. Depending on the velocity, V, of the vehicle 1, features visible in a first image are still visible in the second image of the camera image sequence so that ground plane features can be reconstructed when using Structure From Motion, SFM, to produce a three-dimensional point cloud of detected features.

Features in the captured images can be detected and matched in each captured image to generate feature tracks between positions of corresponding features in the captured images. Features can be detected and matched in each camera image to produce a list of features x1, and x2, wherein x1 is a list of positions of features in a first image and x2 is a list of positions of the same features in the second (next) camera image. Features that cannot be matched are discarded. The features can be calculated and detected by a feature detector such as Harris corner detector, FAST or SIFT. The two lists of the features in the first camera image and of the features in the second camera image form feature tracks or feature correspondences.

In a possible embodiment, coordinates of the features can be converted into normalized homogeneous image coordinates using camera calibration. For a pin-hole camera model with a focal length f, this can be expressed as follows:

$$\begin{pmatrix} y1 \\ y2 \\ 1 \end{pmatrix} \sim \begin{pmatrix} 1 & 0 & 0 & 0 \\ 0 & 1 & 0 & 0 \\ 0 & 0 & 1/f & 0 \end{pmatrix} \begin{pmatrix} p1 \\ p2 \\ p3 \\ 1 \end{pmatrix}$$

wherein $$\begin{pmatrix} p1 \\ p2 \\ p3 \\ 1 \end{pmatrix}$$

are the three-dimensional coordinates of a point P in a three-dimensional space, f is the focal length of the camera, which is known from camera calibration, and wherein $$\begin{pmatrix} y1 \\ y2 \\ 1 \end{pmatrix}$$

are the normalized homogeneous coordinates, i.e. a projection of point P onto the image plane.

For non-pin-hole camera models (such as cameras with fisheye lenses), similar equations can be used.

Position coordinates of the features can be converted into normalized homogeneous image coordinates using camera calibration. Intrinsic calibration describes the properties of the camera lens so that pixels map to rays of light from the camera. Extrinsic calibration describes the position and orientation of the camera mounted on the vehicle's chassis. This means that image pixel coordinates can be converted into normalized homogeneous image coordinates. Using camera calibration to map a pixel coordinate to a ray of light in three-dimensional space is a well-known technique in the field of computer vision.

In a possible embodiment, a translation and rotation of the vehicle camera 2 during a time period between captured images is determined on the basis of the vehicle's speed, V, the vehicle's steering angle, α, and on the basis of a wheelbase, W.

The change in the position of the camera 2 between a first image and a subsequent second image can be calculated in a possible embodiment by integrating the speed and steering data of the vehicle 1 over a time period between the frame of the first image and the frame of the second image.

Given a wheelbase, W, a speed, V, and a steering angle, α, the change in rotation Δφ of the vehicle 1 over a time period Δt, i.e. the period of time between capturing the first and second images, is as follows:

$$\Delta \varphi = \frac{V \Delta t}{W} \tan \alpha$$

The resulting motion matrix can be expressed as follows:

$$[R_{car} | t_{car}] = \begin{bmatrix} \cos\Delta\varphi & \sin\Delta\varphi & 0 & -W\cos\Delta\varphi - V\Delta t + W \\ -\sin\Delta\varphi & \cos\Delta\varphi & 0 & V\sin\Delta\varphi \\ 0 & 0 & 1 & 0 \\ 0 & 0 & 0 & 1 \end{bmatrix}$$

Using the known position of the vehicle camera 2 on the vehicle 1, this can be converted into a translation and rotation of the camera $[R_{camera}/t_{camera}]$.

In alternative embodiments, the change in position of the camera 2 can be also determined by using visual egomotion or using GPS. Different methods for determining the change in position can also be fused together. In a possible implementation, a Kalman filter can be used to combine GPS data with visual egomotion of the vehicle 1 to determine a change in position.

In a possible embodiment, a three-dimensional point cloud of features indicating a position of each feature in a three-dimensional space can be calculated on the basis of the normalized homogeneous image coordinates and the calculated translation and rotation of the camera 2. Structure From Motion, SFM, can be performed to generate a three-dimensional point cloud. The position of each feature in the three-dimensional space can be calculated using the normalized homogeneous coordinates and the knowledge of the camera translation and rotation. The three-dimensional point cloud can be produced from a sequence of images. This point cloud can be a composite of three-dimensional points produced from several hundred image frames. It is possible to generate a three-dimensional point cloud on the basis of at least two subsequent image frames. In a possible embodiment, the three-dimensional point clouds can be stored for a predetermined period of time. If three-dimensional points in the cloud become obscured by an object this information can provide further clues as to where a moving object MO is located. In other possible embodiments, also radar or Lidar can be used to calculate a three-dimensional point cloud of features indicating a position of features in a three-dimensional space around the vehicle 1.

In a possible embodiment, an essential matrix E can be calculated for a motion of the camera 2 on the basis of the determined rotation and translation of the respective camera.

$$E = R_{camera}[t_{camera}]_x$$

$$[t_{cam}]_x = \begin{bmatrix} 0 & -t_3 & t_2 \\ t_3 & 0 & -t_1 \\ -t_2 & t_1 & 0 \end{bmatrix}$$

The essential matrix E can then be used in a cost function to measure how well the features meet the epipolar constraint.

This cost function can then be used to segment the features. Suitable cost functions comprise a measurement of the alegbraic distance, geometric distance, reprojection error or sampson error.

In a possible embodiment, the tracked features can be segmented into features belonging to a moving object MO and into features belonging to a static object SO on the basis of the calculated error. For instance by comparing the calculated error with a threshold value $\varepsilon_{threshold}$. The value of the threshold value $\varepsilon_{threshold}$ can depend on the accuracy of the optical flow and can depend on the accuracy and latency of the estimates of the camera position.

In a possible embodiment, the segmented features belonging to moving objects MO can be clustered and a convex hull around the segmented features of each cluster can be calculated. In a possible implementation, the segmented features can be clustered by applying a density-based spatial clustering of applications with noise (DBSCAN) algorithm to the segmented features. The convex hull is then calculated around the segmented features of the moving object MO.

FIG. 3 shows an example of a cluster with a convex hull H around a moving object MO. In the illustrated example, the moving object MO is a pedestrian moving on a parking lot with different parking spaces on the ground. In the illustrated example, a baby carriage BC is also positioned on the ground comprising static feature points. In the illustrated example of FIG. 3, a plurality of detected features belonging to a ground plane GP are illustrated. The ground features can be determined by selecting triangulated features belonging to static objects with a height below a threshold height. The value of the threshold height can be adjusted. The baby carriage BC illustrated in FIG. 3 also forms a static object SO having structural components which can be used to detect features such as intersections of the structure of the baby carriage BC. Further, the lines on the ground plane GP can also be used for detecting features f (e.g. $f_1$, $f_2$, $f_3$, $f_4$) of the ground plane GP. Some features in the illustrated example are segmented as belonging to a moving object MO. These features are segmented to form a cluster and a convex hull H is calculated around the segmented features of the respective cluster. The bearing B (see FIG. 1) of the moving object MO, e.g. the pedestrian illustrated in FIG. 3, is determined on the basis of the detected cluster of features belonging to the moving object MO. In a possible embodiment, an azimuth bearing i.e. azimuth angle of a moving object MO can be determined on the basis of the calculated convex hull H around a cluster of segmented features belonging to the respective moving object MO. In a possible embodiment, a range of values of azimuth bearings i.e. angles can be determined by taking the minimum and maximum bearings of the points of features included in the convex hull H. Alternatively, a minimum or maximum of azimuth bearings B1, B2 of the convex hull H itself can be used (see FIG. 1 and FIG. 3). In a further possible embodiment, the size of the moving object MO can also be taken into account. For example, the minimum or maximum of the lower half of the respective moving object can be used if the object is not substantially rectangular.

FIG. 3 shows a determined azimuth bearing value range of the moving object MO between bearings B1, B2 with respect to the camera 2 of the vehicle 1. As can be seen in FIG. 3, there are several features $f_1$, $f_2$, $f_3$, $f_4$ of the ground plane GP within the estimated bearing range (i.e. angular range of bearings) between bearing B1 and bearing B2 in front of the moving object MO (i.e. between the moving object MO and the camera) which are not occluded by the moving object MO, i.e. pedestrian. In the example of FIG. 3, there are four features $f_1$, $f_2$, $f_3$, $f_4$ belonging to the ground plane GP within the determined bearing range of the moving object MO, which are not occluded by the moving object MO. The range, i.e. distance, of the moving object MO, i.e. pedestrian, can be estimated on the basis of the determined ground features belonging to the ground plane GP along the determined bearing B of the moving object MO which are not occluded by the moving object MO. The bearing B can be calculated as an average value of the minimum bearing B1 and the maximum bearing B2. In a possible embodiment, from among the determined ground features, the ground feature having a maximum distance is selected. In the illustrated example of FIG. 3, feature $f_4$ located within the bearing range between B1, B2 and comprising a maximum distance to the vehicle camera 2 is selected and the range of the moving object MO is derived from this maximum distance. Ground points, i.e. ground plane features, can be determined by searching for triangulated features with roughly zero height. Alternatively, a ground plane GP can be fitted to the triangulated points using for instance a RANSAC algorithm or least squares approximation to find features belonging to the ground plane GP. The range of the moving object MO can then be estimated by considering all triangulated static three-dimensional ground points within the azimuth bearing range of the moving object MO and selecting those ground plane features comprising the maximum distance from the vehicle camera 2.

Cameras with fisheye lenses can produce a dense three-dimensional point cloud for ground plane features close to the vehicle 1. Therefore, the estimate of the range of the moving object MO gets more accurate as the moving object MO gets closer to the vehicle 1. The calculated estimate is always closer than the real distance to the moving object MO, reducing therefore the chances of overestimating a distance and the danger of colliding with the moving object MO. In the simple example of FIG. 3, the distance to the moving object MO is estimated on the basis of the distance between the camera 2 and feature $f_4$ belonging to the ground plane GP as the ground plane feature within the bearing range being farthest away from the vehicle camera 2 but not occluded by the moving object MO.

The method according to the present invention makes use of the fact that two-dimensional features can be tracked throughout the camera image and a three-dimensional ground plane can be reconstructed as the vehicle 1 moves. A moving object MO moving across the ground plane GP occludes three-dimensional points on the ground plane. This occlusion can be used to estimate a range i.e. distance of the moving object MO. The method can be used to estimate a range i.e. distance of different kinds of moving objects MO such as other vehicles or pedestrians. It is not required that the moving object MO is a rigid object. It is also not necessary that many features can be tracked on the object. With the method according to the present invention, a range i.e. distance of any moving object MO moving on a ground plane in a vehicle's surrounding can be estimated. The method can be used in any situation where there is a need to track non-rigid objects that are moving on a ground plane using a single camera 2 mounted on a moving vehicle 1. The method can be used for detection of pedestrians, for a backup warning or for automatic braking. A backup warning system can be implemented in which a three-dimensional model is created of static objects SO and additionally moving objects MO are tracked and clustered in the two-dimensional image, wherein a range i.e. distance can be estimated from occluded points on the three-dimensional ground plane. A warning can be automatically produced and output to a driver of the vehicle 1 when a moving object MO is detected that could result in a collision with the vehicle 1.

The invention claimed is:

1. A method of estimating a distance to a moving object, comprising the steps:
   capturing images of a surrounding environment by a camera;
   by processing the images, detecting therein a cluster of features belonging to the moving object, and determining an azimuth angle of the moving object based on the cluster of features;

in the images, determining static ground features that belong to a ground plane in the surrounding environment, and that are located along the azimuth angle of the moving object between the camera and the moving object, and that are not occluded from the images by the moving object;

selecting a most-distant one of the static ground features that has a maximum distance from the camera among all of the determined static ground features; and estimating a distance to the moving object based on the maximum distance of the most-distant static ground feature.

2. The method according to claim 1, wherein the surrounding environment is a surrounding environment of a vehicle, the camera is a vehicle camera of the vehicle, and the capturing of the images is performed by the vehicle camera while the vehicle is moving.

3. The method according to claim 1, further comprising detecting and matching corresponding ones of the respective features among successive ones of the images to generate feature tracks between respective positions of corresponding matched features in the images.

4. The method according to claim 1, further comprising determining and converting position coordinates of the respective features into normalized homogeneous image coordinates using camera calibration.

5. The method according to claim 2, further comprising determining a translation and a rotation of the vehicle camera during a time period between successive ones of the images based on a speed, a steering angle, and a wheelbase of the vehicle.

6. The method according to claim 5, further comprising determining and converting position coordinates of the respective features into normalized homogeneous image coordinates using camera calibration, and calculating a 3D point cloud of the features indicating a respective position of each respective one of the features in a three-dimensional space based on the normalized homogeneous image coordinates and the translation and the rotation of the vehicle camera.

7. The method according to claim 6, further comprising calculating an essential matrix for a motion of the vehicle camera based on the rotation and the translation of the vehicle camera.

8. The method according to claim 1, further comprising calculating errors related to an epipolar constraint of the features, and segmenting the features into moving features belonging to moving objects and static features belonging to static objects based on the errors.

9. The method according to claim 8, further comprising clustering the moving features into feature clusters, and calculating a convex hull respectively around the moving features of each one of the feature clusters.

10. The method according to claim 9, wherein the determining of the azimuth angle of the moving object is based on the convex hull calculated around the feature cluster belonging to the moving object.

11. The method according to claim 1, wherein the determining of the ground features comprises selecting triangulated features belonging to static objects with a height below a threshold height.

12. The method according to claim 1, wherein the azimuth angle is a range of azimuth angle values spanned by the moving object from a minimum azimuth angle value to a maximum azimuth angle value.

13. The method according to claim 1, wherein the azimuth angle is an average value of a minimum azimuth angle value and a maximum azimuth angle value bounding an azimuth angle range spanned by the moving object.

14. An apparatus for estimating a distance to a moving object, comprising:

a camera configured to capture images of a surrounding environment; and a processing unit configured:

to process the images, so as to detect therein a cluster of features belonging to the moving object, and so as to determine an azimuth angle of the moving object based on the cluster of features;

to determine, in the images, static ground features that belong to a ground plane in the surrounding environment, and that are located along the azimuth angle of the moving object between the camera and the moving object, and that are not occluded from the images by the moving object;

to select a most-distant one of the static ground features that has a maximum distance from the camera among all of the determined static ground features; and to estimate a distance to the moving object based on the maximum distance of the most-distant static ground feature.

15. A vehicle comprising a vehicle body and the apparatus according to claim 14.

16. The vehicle according to claim 15, wherein the moving object is a pedestrian or another vehicle in the surrounding environment.

* * * * *